Patented Nov. 20, 1945

2,389,217

UNITED STATES PATENT OFFICE 2,389,217

PROCESS FOR THE MANUFACTURE OF MALONONITRILE

Alexander R. Surrey, Albany, N. Y., assignor to Winthrop Chemical Company, Inc., New York, N. Y., a corporation of New York No Drawing. Application August 26, 1943, Serial No. 500,073

9 Claims. (Cl. 260—464)

This invention relates to a process for the preparation of malononitrile, a useful intermediate in the synthesis of vitamin $B_1$.

Although there has been previously described a method for the preparation of malononitrile by fusing a dry mixture of cyanoacetamide and phosphorus pentachloride, this method is not adapted to the preparation of large quantities of the nitrile. When an attempt is made to conduct the reaction on any relatively large scale, the temperature frequently rises beyond control with resultant rapid polymerization and loss of the desired product.

I have found that the difficulties inherent in the prior procedure for the preparation of malononitrile can be obviated by my new process, which comprises heating a mixture of cyanoacetamide, an alkali metal chloride, and a dehydrating agent such as phosphorus oxychloride, phosphorus pentachloride, and mixtures thereof, in a solvent such as ethylene dichloride or benzene.

The present invention employs a solvent inert to the reactants in effecting dehydration of cyanoacetamide at a lower temperature than that required for the fusion procedure. The addition of an alkali metal chloride, such as sodium chloride or potassium chloride to the reaction mixture increases the yield considerably. In the absence of sodium chloride, a red, viscous mass separates from the reaction mixture and can be filtered off only with great difficulty. The use of sodium chloride results in the formation of a lighter-colored, granular precipitate which is easily removed by filtration. The solvent is distilled from the filtrate and the residue, crude malononitrile, is then distilled without difficulty.

The invention is illustrated by the following specific example, but is not limited thereto.

Example

Twelve hundred and sixty grams (15 moles) of cyanoacetamide, 800 ml. of phosphorus oxychloride, 1000 g. of sodium chloride, and 5 liters of ethylene dichloride are placed in a 12 liter 3 neck round bottom flask and refluxed with stirring for eight hours. After cooling, the mixture is filtered and the precipitate is washed with 500 ml. of solvent. The filtrates are combined and the ethylene dichloride is distilled under reduced pressure. The residual oil is decanted from any solid matter into a clean flask. The yield of crude malononitrile is about 790 g. Vacuum distillation of this crude material gives a colorless malononitrile, B. P. 113–118° (25 mm.) which solidifies on cooling; yield, 700–720 g., 70–72% of the theory based on cyanoacetamide.

Instead of using ethylene dichloride as the solvent in the above example, there can be used any other solvent inert to the reactants, such as liquid hydrocarbons or liquid halogenated hydrocarbons. Such solvents include, for example, acetylene tetrachloride, benzene, toluene, etc. I have found that ethylene dichloride is a particularly suitable solvent and in comparative tests against other solvents has afforded especially high yields.

I claim as my invention:

1. The process for the preparation of malononitrile which comprises heating a mixture of cyanoacetamide, an amount of an alkali metal chloride adequate to ensure the formation of a granular precipitate, and a dehydrating agent of the group consisting of phosphorus oxychloride, phosphorus pentachloride, and mixtures thereof in a solvent inert to the reactants.

2. The process for the preparation of malononitrile which comprises heating a mixture of cyanoacetamide, a substantial quantity of an alkali metal chloride, and a dehydrating agent of the group consisting of phosphorus oxychloride, phosphorus pentachloride, and mixtures thereof in ethylene dichloride.

3. The process for the preparation of malononitrile which comprises heating a mixture of cyanoacetamide, a substantial quantity of an alkali metal chloride, and a dehydrating agent of the group consisting of phosphorus oxychloride, phosphorus pentachloride, and mixtures thereof in benzene.

4. The process for the preparation of malononitrile which comprises heating a mixture of approximately equimolecular quantities of cyanoacetamide and sodium chloride with phosphorus oxychloride in ethylene dichloride.

5. The process for the preparation of malononitrile which comprises heating a mixture of approximately equimolecular quantities of cyanoacetamide and sodium chloride with phosphorus oxychloride and phosphorus pentachloride in ethylene dichloride.

6. The process for the preparation of malononitrile which comprises heating a mixture of approximately equimolecular quantities of cyanoacetamide and sodium chloride with phosphorus oxychloride in benzene.

7. The process for the preparation of malononitrile which comprises heating a mixture of cyanoacetamide, a substantial quantity of an alkali metal chloride, and a dehydrating agent of the class consisting of phosphorus oxychloride, phosphorus pentachloride, and mixtures thereof in a solvent selected from the group consisting of ethylene dichloride and benzene.

8. A process for the preparation of malononitrile which comprises refluxing cyanoacetamide with an approximately equimolecular quantity of an alkali metal chloride and an agent selected from the group consisting of phosphorus oxychloride, phosphorus pentachloride and mixtures thereof in an inert solvent and isolating the malononitrile thus formed.

9. A process for the preparation of malononitrile which comprises refluxing cyanoacetamide with an alkali metal chloride in the relative proportions, by weight, of about 1¼:1 and an agent selected from the group consisting of phosphorus oxychloride, phosphorus pentachloride and mixtures thereof in an inert solvent at the refluxing temperature of such solvent and isolating the malononitrile thus formed in a purified condition.

ALEXANDER R. SURREY.